(12) United States Patent
Shirokura et al.

(10) Patent No.: US 6,841,227 B2
(45) Date of Patent: Jan. 11, 2005

(54) IMAGE-RECEIVING SHEET FOR ELECTROPHOTOGRAPHY

(75) Inventors: Yukio Shirokura, Fujinomiya (JP); Takahito Miyoshi, Fujinomiya (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 52 days.

(21) Appl. No.: 10/382,859

(22) Filed: Mar. 7, 2003

(65) Prior Publication Data
US 2003/0175484 A1 Sep. 18, 2003

(30) Foreign Application Priority Data
Mar. 18, 2002 (JP) ......................... 2002-074756

(51) Int. Cl.⁷ ............................ B32B 27/14; B32B 3/00
(52) U.S. Cl. ..................................... 428/195.1; 428/480
(58) Field of Search .............................. 428/195.1, 480

(56) References Cited

U.S. PATENT DOCUMENTS 6,312,788 B1 * 11/2001 Mohri et al. ............. 428/195.1

FOREIGN PATENT DOCUMENTS

JP    A 2000 112166    4/2000

* cited by examiner

Primary Examiner—B. Shewareged
(74) Attorney, Agent, or Firm—Young & Thompson

(57) ABSTRACT

The present invention provides an image-receiving sheet for electrophotography, which is capable of providing an image excellent in gloss and which has an excellent offset resistance during a fixing step at a high temperature. The toner image-receiving layer comprises a polyester resin having the following characteristic properties:

(1) said polyester resin containing at least 10%, based on the molar number of the whole polyhydric alcohol components, of bisphenol A as a polyhydric alcohol component;
(2) said polyester resin has an intrinsic viscosity of 0.30 to 0.70;
(3) said polyester resin has a flow-starting temperature of 100 to 160° C.; and
(4) said polyester resin has a glass transition temperature ranging from 50° C. to a temperature lower than the fixing temperature by 10° C.

9 Claims, No Drawings

IMAGE-RECEIVING SHEET FOR ELECTROPHOTOGRAPHY

BACKGROUND OF THE INVENTION

The present invention relates to an image-receiving sheet for electrophotography, which is capable of providing an image excellent in gloss and which has an excellent offset resistance to fixing at a high temperature. The present invention also relates to a process for producing an image-receiving sheet for electrophotography having the above-described characteristic properties and capable of being easily produced.

An electrophotographic method is employed for output devices of copying machines and personal computers, because in this method, dry treatment is employed, the printing speed is high and general papers (plain papers and woodfree papers) are usable.

When image information such as a face or scenery is to be output as a photograph on an image-receiving sheet for the electrophotography, a special purpose photographic paper is necessitated, because the general papers are of poor quality particularly in gloss. For improving the gloss, an image-receiving sheet for electrophotography, which comprises (1) a support and (2) a toner image-receiving layer containing a thermoplastic resin formed on the support were proposed in J. P. KOKAI Nos. Hei 4-212168 and Hei 8-211645.

Further, images of a high quality have been demanded recently. For meeting this demand, it is required to perform fixing at a higher temperature under a higher pressure than those in the prior art. The investigations have been made for developing the materials satisfying these requirements.

J. P. KOKAI No. 2000-112166 discloses an electrophotographic material for the transfer, which has a high heat resistance and which is free from the contraction deformation at a high temperature as well as sticking during a fixing step.

However, this technique has problems in that the effect of preventing the sticking is not yet satisfactory and in that the offset easily occurs in the fixing step in which the temperature and pressure are high.

SUMMARY OF THE INVENTION

The object of the present invention is to provide an image-receiving sheet for electrophotography, which is capable of providing an image having an excellent gloss and which has a high offset resistance during a fixing step at a high temperature under a high pressure.

Another object of the present invention is to provide a process for easily producing an image-receiving sheet for electrophotography having the above-described characteristic properties.

After intensive investigations made for the purpose of solving the above-described problems, the inventors have found that the problems can be solved by using the specific polyester resin having the characteristic properties described below as a resin to be used for the toner image-receiving layer formed on a support; and the present invention has been attained on the basis of this finding:

(1) said polyester resin containing at least 10%, based on the molar number of the whole polyhydric alcohol components, of bisphenol A as a polyhydric alcohol component;

(2) said polyester resin having an intrinsic viscosity of 0.30 to 0.70;

(3) said polyester resin having a flow-starting temperature of 100 to 160° C.; and (4) said polyester resin having a glass transition temperature ranging from 50° C. to a temperature lower than a fixing temperature by 10° C.

DESCRIPTION OF THE PREFERRED EMBODIMENTS

The detailed description will be given on the present invention.

Support

As the supports used for the electrophotographic image-receiving sheet of the present invention, various supports can be used so far as they are usable for the electrophotographic image-receiving sheet.

The supports can be selected among various materials so far as they are resistant to a fixing temperature and they satisfy the requirements of the smoothness, degree of whiteness, sliding property, abrasion and antistatic property.

The supports usable herein are, for example, base or raw papers (including synthetic papers), synthetic resin sheets and coated papers prepared by coating such sheets with a resin or the like.

The supports may be either mono-layered or multi-layered.

Materials for the base papers can be selected among various materials used for forming well-known base papers without any particular limitation. Examples of them are natural pulps selected from those of conifers and broadleaf trees; synthetic pulps made of plastic materials such as polyethylene and polypropylene; and mixtures of the natural pulp and synthetic pulp. As pulp fibers used for producing the base papers, broadleaf tree pulp originally having a short fiber length is preferably used as the main material.

For beating the pulps, beaters, refiners, etc. can be used. If necessary, various additives such as fillers, dry strength additives, sizing agents, wet strength additives, fixing agents and pH regulators are added to a pulp slurry (hereinafter referred to as "pulp stock") obtained after the beating of the pulp.

If necessary, the base papers may contain fillers such as clay, talc, calcium carbonate and fine urea resin particles; sizing agents such as rosin, alkenylketene dimers, higher fatty acids, epoxidized fatty acid amides and alkenylsuccinic acids; strength additives such as starches, polyamide polyamine epichlorohydrin and polyacrylamide; and fixing agents such as alumina sulfate and cationic polymers.

The fillers include, for example, calcium carbonate, clay, kaolin, china clay, talc, titanium oxide, diatomaceous earth, barium sulfate, aluminum hydroxide and magnesium hydroxide.

The dry strength additives include, for example, cationized starch, cationized polyacrylamide, anionized polyacrylamide, amphoteric polyacrylamide and carboxy-modified polyvinyl alcohol.

The sizing agents include, for example, fatty acid salts, rosin, rosin derivatives such as maleinized rosin, paraffin wax, alkylketene dimers (AKD), as well as higher fatty acid-containing compounds such as alkenyl succinic anhydrides (ASA) and epoxidized fatty acid amides (EFA).

The wet strength additives include, for example, polyamine polyamide epichlorohydrin, melamine resin, urea resin and epoxidized polyamide resin.

The fixing agents include, for example, polyvalent metal salts such as aluminum sulfate and aluminum chloride, and cationic polymers such as cationized starch.

The pH regulators include, for example, sodium hydroxide and sodium carbonate.

Other additives are, for example, defoaming agents, dyes, slime controlling agents and fluorescent brightening agents. If necessary, a softening agent or the like can also be used. The softening agents are described in, for example, *Shin-Kami Kako Binran* (edited by Shiyaku Time Co.) (pages 554 to 555) (published in 1980).

Processing solutions used for the surface sizing treatment may contain, for example, a water-soluble high-molecular substance, a sizing agent, a water-resistant substance, a pigment, a pH regulator, a dye, a fluorescent brightening agent or the like. The water-soluble high-molecular substances include, for example, cationized starch, polyvinyl alcohol, carboxy-modified polyvinyl alcohol, carboxymethylcellulose, hydroxyethylcellulose, cellulose sulfate, gelatin, casein, polysodium acrylate, sodium salt of styrene/maleic anhydride copolymer and polysodium styrenesulfonate.

The water-resistant substances include, for example, latex emulsions of styrene/butadiene copolymer, ethylene/vinyl acetate copolymer, polyethylene and vinylidene chloride copolymers: and polyamide polyamine epichlorohydrin.

The pigments include, for example, calcium carbonate, clay, kaolin, talc, barium sulfate and titanium oxide.

Preferred examples of the base papers include woodfree papers and papers described in, for example "Shashin Kogaku no Kiso (Fundamentals of Photographic Engineering)—Gin'en Shashin-Hen (Edition of Silver salt Photos)—" (edited by Nippon Shashin Gakkai and published by Corona Co., Ltd. in 1979), pages 223 to 240.

The basis weight of the base paper is in the range of, for example, 50 to 250 g/m$^2$, preferably 100 to 180 g/m$^2$.

The thickness of the base paper is in the range of, for example, 30 to 500 $\mu$m, preferably 50 to 300 $\mu$m and particularly preferably 100 to 200 $\mu$m.

For improving the rigidity and dimensional stability (curling property) of the electrophotographic image-receiving sheet, the ratio (Ea/Eb) of the longitudinal Young's modulus (Ea) to the transverse Young's modulus (Eb) is preferably in the range of 1.5 to 2.0. When Ea/Eb value is below 1.5 or above 2.0, the rigidity and curling property of the electrophotographic image-receiving sheet are inclined to be poor to cause troubles in the running property in the carrying step.

The base paper used for forming the support is preferably that made of pulp fibers having, for example, such a fiber length distribution that the total of 24 mesh screen residue and 42 mesh screen residue is 20 to 45% by mass, and the 24 mesh screen residue is not larger than 5% by mass so as to impart the desired center line average roughness to the surface thereof as described in, for example, J. P. KOKAI No. Sho 58-68037. The center line average roughness can be controlled by the surface treatment by heat and pressure with, for example, a machine calender and a super calender.

A synthetic resin sheet (film) as the support is produced by molding a synthetic resin in the form of a sheet. It can be obtained by, for example, extrusion-molding a polyolefin resin such as polypropylene resin to form a sheet.

A coated paper used as the support is a paper or a sheet obtained by coating one or both surfaces of a sheet of a base paper or the like with a resin, a rubber latex or a high-molecular material. The amount of the coating varies depending on the use of the support. The coated papers include, for example, art paper, cast-coated paper and Yankee paper.

The sheet of the base paper or the like may be laminated with a resin, a rubber or a high-molecular sheet or film. The materials usable for the lamination include, for example, polyolefins, polyvinyl chloride, polyethylene terephthalate, polystyrene, polymethacrylates, polyethylene terephthalate, polycarbonates, polypropylene, polyimides and triacetylcellulose. Such a sheet or film may be treated to provide white reflection thereto. The treatment can be conducted by, for example, incorporating a pigment such as titanium oxide into the sheet or film.

The support may be a laminate of supports selected from among the above-described various supports.

In a preferred example of methods for coating the base paper with the resin or the like, the base paper is coated or impregnated with a resin solution or suspension, or the solution or suspension is sprayed on the paper.

One or both surfaces of the base paper are preferably activated by corona discharge treatment, flame treatment, glow discharge treatment or plasma treatment for the purpose of improving the adhesion with the resin or the like to be applied to the base paper.

When the coated paper is used as the support, a thermoplastic resin is preferred as the resin to be applied to the surface of the base paper or the like.

Examples of the thermoplastic resins are as follows:

(A) Polyolefin resins such as polyethylene resin and polypropylene resin; copolymer resins composed of an olefin such as ethylene or propylene and another vinyl monomer; and acrylic resin, (B) Thermoplastic resins having an ester linkage:

Polyester resins obtained by the condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid or pyromellitic acid, with an alcohol component such as ethylene glycol, diethylene glycol, propylene glycol, 2-ethylcyclohexyldimethanol, neopentyl glycol, cyclohexyldimethanol or glycerol; polyacrylic acid ester resins or polymethacrylic acid ester resins such as polymethyl methacrylate, polybutyl methacrylate, polymethyl acrylate and polybutyl acrylate; polycarbonate resins; polyvinyl acetate resins; styrene acrylate resins; styrene/methacrylic acid ester copolymer resins and vinyltoluene acrylate resins. Concrete examples of them are those described in J. P. KOKAI Nos. Sho 59-101395, Sho 63-7971, Sho 63-7972, Sho 63-7973 and Sho 60-294862. Commercially available thermoplastic resins usable herein are, for example, Vylon 290, Vylon 200, Vylon 280, Vylon 300, Vylon 103, Vylon GK-140 and Vylon GK-130 (products of Toyobo Co., Ltd.); Tafton NE-382, Tafton U-5, ATR-2009 and ATR-2010 (products of Kao Corporation); Erither UE 3500, UE 3210 and XA-8153 (products of Unitika Ltd.); and Polyester TP-220 and R-188 (products of The Nippon Synthetic Chemical Industry Co., Ltd.), (C) Polyurethane resin, etc., (D) Polyamide resin, urea resin, etc., (E) Polysulfone resin, etc., (F) Polyvinyl chloride resin, polyvinylidene chloride resin, vinyl chloride/vinyl acetate copolymer resin, vinyl chloride/vinyl propionate copolymer resin, etc.

(G) Polyol resins such as polyvinyl butyral; and cellulose resins such as ethyl cellulose resin and cellulose acetate resin, and (H) Polycaprolactone resin, styrene/maleic anhydride resin, polyacrylonitrile resin, polyether resins, epoxy resins and phenolic resins.

The thermoplastic resins may be used either alone or in the form of a mixture of them.

When the coated paper is used as the support, the thermoplastic resin to be applied is particularly preferably a polyethylene such as a high-density polyethylene or a low-density polyethylene, another polyolefin such as polypropylene, or a polyester. These resins may be used in the form of a mixture of them.

Generally a low-density polyethylene is used as the polyolefin. However, for improving the thermal resistance of the support, it is preferred to use polypropylene, a blend of polypropylene and polyethylene, a high-density polyethylene, or a blend of the high-density polyethylene and a low-density polyethylene. From the viewpoints of costs and suitableness for the laminate, the blend of the high-density polyethylene and the low-density polyethylene is most preferred.

Toner Image-receiving Layer

The toner image-receiving layer provided on at least one surface of the support is composed of a polyester resin.

The polyester resins are esters of a polycarboxylic acid and a polyhydric alcohol.

Preferred polycarboxylic acids include, for example, terephthalic acid, isophthalic acid, maleic acid, fumaric acid, phthalic acid, adipic acid, sebacic acid, azelaic acid, abietic acid, succinic acid, naphthalenedicarboxylic acid, trimellitic acid or pyromellitic acid. Preferred polyhydric alcohols include dibasic acids. The dibasic acids are preferably aromatic dicarboxylic acids such as terephthalic acid and isophthalic acid.

Preferred polyhydric alcohols include, for example, ethylene glycol, diethylene glycol, propylene glycol, bisphenol A, diether derivatives of bisphenol A (such as 2 ethylene oxide adduct of bisphenol A and 2 propylene oxide adduct of bisphenol A), and alcohol components such as bisphenol S, 2-ethylcyclohexyldimethanol, neopentyl glycol, cyclohexyldimethanol and glycerol (such alcohol components may be substituted with a hydroxyl group or the like). Among them, dihydric alcohols such as ethylene glycol, diethylene glycol, propylene glycol, bisphenol A, bisphenol S, 2-ethylcyclohexyldimethanol, neopentyl glycol and cyclohexyldimethanol are preferred.

In the present invention, bisphenol A used as the polyhydric alcohol constituting the polyester resin is used in an amount of at least 10 molar % based on the total molar number of the whole polyhydric alcohol components. By using bisphenol A in such an amount, the offset resistance is improved.

Bisphenol A is usable in the form of an adduct thereof. In the preparation of the polyester resin, the adduct in the form of bisphenol A adduct is incorporated, as the alcohol component, into the polyester resin.

The amount of bisphenol A is preferably at least 30 molar %, more preferably at least 50 molar %. The upper limit thereof will be usually 95 molar %. When it is used in the form of an adduct thereof, the amount thereof is calculated as the amount of bisphenol A.

Terephthalic acid is usually used as the polycarboxylic acid. As a matter of course, other polycarboxylic acids are usable in combination with it. Other polycarboxylic acids are preferably isophthalic acid, naphthalenedicarboxylic acid and sebacic acid.

The polycarboxylic acids are usually used in the form of esters thereof. In the polyesterification reaction, the trans-esterification reaction occurs between such a polycarboxylic acid and a polyhydric alcohol to form a polyester resin.

Preferred alcohol components constituting the polycarboxylic acid esters include lower alcohols such as methyl alcohol and ethyl alcohol.

In forming the polyester resin of the present invention, it is preferred to use at least 50 molar %, desirably at least 60 molar %, of terephthalic acid as the polycarboxylic acid.

The polyester resin used in the present invention must have a intrinsic viscosity (IV) of 0.30 to 0.70. When the intrinsic viscosity is below 0.30, the toner image-receiving layer is brittle and easily broken, and the surface cracking is caused after the toner fixing to damage the image quality. On the other hand, when the intrinsic viscosity is above 0.70, the polymer productivity is lowered and the obtained polyester resin is easily colored. The intrinsic viscosity is preferably 0.35 to 0.65, more preferably 0.40 to 0.60.

In an example of the determination of the intrinsic viscosity, it is suitably determined by, for example, dissolving the polyester resin in a mixed solution of phenol: 1,1,2,2-tetrachloroethane=3:2 (mass ratio) and then determining the intrinsic viscosity with an Ubbellohde's viscometer at 25° C.

The flow starting temperature (FST) of the polyester resin of the present invention is 100 to 160° C., preferably 110 to 145° C. When the flow starting temperature is below 100° C., the toner image-receiving layer sticks to a fixing roll or fixing belt in the toner fixing step to easily cause the offset. On the other hand, when the flow starting temperature exceeds 160° C., the toner image-receiving layer is not sufficiently softened in the fixing step and, therefore, the embedding of the toner in the toner image-receiving layer is unsatisfactory for obtaining an image excellent in the gloss.

The flow starting temperature can be determined according to JIS K7210. For example, it can be determined with a flow tester (CFT-500D; a product of Shimadzu Corporation) after pulverizing the polyester resin.

The polyester resin of the present invention has a glass transition temperature (Tg) in the range from 50° C. to a temperature lower than the fixing temperature by 10° C. The fixing temperature, which usually varies depending on the fixing device, is for example, 120 to 180° C. Accordingly, the glass transition temperature of the polyester resin is about 50 to 120° C., preferably about 60 to 110° C.

When the glass transition temperature of the polyester resin is below 50° C., the offset resistance is seriously reduced. On the other hand, when the glass transition temperature is higher than a point which is lower than the fixing temperature by 10° C., the embedding of the toner in the toner image-receiving layer is unsatisfactory for obtaining an image excellent in the gloss.

The glass transition temperature of the polyester resin can be determined according to JIS K7121.

The polyester resin used in the present invention has a mass average molecular weight of preferably about 10,000 to 200,000, particularly preferably about 30,000 to 100,000.

The polyester resin used in the present invention can be produced by, for example, the condensation reaction via trans-esterification reaction of a polycarboxylic ester such as ethyl terephthalate with a polyhydric alcohol such as ethylene glycol, bisphenol A or an adduct thereof in the presence of, if necessary, a catalyst. Process for producing the polyester resin is not limited to this esterification reaction. Various embodiments are self-evident for those skilled in the art.

The polyesterification reaction temperature is preferably, for example, about 150 to 350° C., particularly preferably about 200 to 280° C.

The polyesterification reaction time which varies depending on the reaction temperature is, for example, about 2 to 20 hours, particularly preferably about 4 to 10 hours.

If necessary, an esterification reaction catalyst is usable for the polyesterification reaction. The catalysts are, for example, antimony compounds, germanium compounds and titanium compounds.

The polyester resin of the present invention can be applied to the support to coat or to laminate the support by mixing the polyester resin with, if necessary, additives such as a plasticizer which will be described below, melting the obtained mixture by means of a kneader, extruder, heated kneading roll, Bambury mixer, kneader or the like and melt-extruding the molten mixture through the slit on at least one surface of the support. When another polyester resin for forming an intermediate layer is to be formed between the support and the toner image-receiving layer, the two layers can be formed at once on the support by co-melt-extruding the polyester resin for forming the toner image-receiving layer and another polyester resin for forming the intermediate layer.

The polyester resin layer constituting the toner image-receiving layer may be a laminate of two or more layers. In this case, two or more layers of the same or different polypropylene resins, for example, a laminate of two or more layers thereof can be formed by the co-melt-extrusion.

The thickness of the toner image-receiving layer comprising the polyester resin in the present invention is, for example, at least a half, preferably 1 to 3 times as much as the toner particle diameter. Concretely, the thickness is, for example, 3 to 50 μm, preferably 10 to 40 μm.

It is preferred that the polyester resin layer is substantially free of any pigment or filler. Even when a pigment or filler is contained therein, the amount thereof is not larger than, for example, 40% by mass based on the polyester resin layer. When the pigment content is higher than this level, the electrophotographic image-receiving sheet is easily elongated by the hygroscopicity after receiving the image to cause a stress between the toner image-receiving layer and the toner layer and, therefore, to cause the curling and cracking of the toner layer. Thus, pigments can be used so far as such problems are not caused. However, it is particularly preferred that the polyester resin layer is completely free of the pigment or the like.

The amount of the polyester resin is usually at least 20% by mass, preferably 30 to 100% by mass, based on the toner image-receiving layer.

The toner image-receiving layer comprising the polyester resin formed on the surface of the support (toner image-receiving layer side) preferably has the mirror surface (gloss surface).

The toner image-receiving layer used in the present invention may contain various additives for improving the thermodynamic properties of this layer, in addition to the thermoplastic resin. The additives include, for example, plasticizers, slip agents or releasing agents, fillers, crosslinking agents, emulsifying agents and dispersing agents.

As the plasticizers, known plasticizers for resins are usable without any limitation. The plasticizers have a function of controlling the fluidization or softening of the toner image-receiving layer by heat and/or pressure in the step of fixing the toner.

The plasticizers can be selected with reference to "*Kagaku Binran* (Handbook of Chemistry)" (edited by Nihon Kagaku-kai and published by Maruzen Co., Ltd.), "*Kaso-zai—Sono Riron to Ouyou*—(Plasticizers—The Theory and Application Thereof—)" (edited by Koichi Murai and published by Saiwai Book Publishing Co.), "*Kasozai no Kenkyu* (Study of Plusticizers), Part 1 and Part 2 (edited by Kobunshi Kagaku Kyokai", and "Handbook, Chemicals to be Incorporated into Rubber•Plastic" (edited by Rubber Digest Co.).

The plasticizers include those described as high-boiling organic solvents and thermal solvents; esters described in, for example, J. P. KOKAI Nos. Sho 59-83154, 59-178451, 59-178453, 59-178454, 59-178455, 59-178457, 62-174754, 62-245253, 61-209444, 61-200538, 62-9348, 62-30245, 62-136646, 62-174754, 62-245253, 61-209444, 61-200538, 62-8145, 62-9348, 62-30247 and 62-136646, and J. P. KOKAI No. Hei 2-235694 (such as phthalic acid esters, phosphoric acid esters, fatty acid esters, abietic acid esters, adipic acid esters, sebacic acid esters, azelaic acid esters, benzoic acid esters, butyric acid esters, epoxidized fatty acid esters, glycolic acid esters, propionic acid esters, trimellitic acid esters, citric acid esters, sulfonic acid esters, carboxylic acid esters, succinic acid esters, maleic acid esters, fumaric acid esters, phthalic acid esters and stearic acid esters), amides (such as fatty acid amides and sulfoamides), ethers, alcohols, lactones and polyethyleneoxy compounds.

The plasticizers are usable in the form of a mixture with the resin.

Polymers having a relatively low molecular weight can be used as the plasticizer. The molecular weight of the polymer is preferably lower than that of the binder resin to be plasticized. The molecular weight is not higher than 15,000, preferably not higher than 5,000.

In addition to the above-described compounds, commercially available plasticizers are usable. They include, for example, Adecacizer PN-170 and PN-1430 (Asahi Denka Kogyo K.K.); PARAPLEX-G-25, G-30 and G-40 (C. P. HALL Co.); and Ester Gum 8L-JA, Ester R-95, Pentalin 4851, FK115, 4820, 830, Luizol 28-JA, Picolastic A75, Picotex LC and Crystalex 3085 (Rika Hercules).

The plasticizer is optionally usable for relieving the stress or strain caused when the toner particles are embedded in the toner image-receiving layer (such as physical strains caused by elastic power, viscosity or the like, and strains caused by material balance of the molecule, main chain of binder, pendant part, etc.).

The plasticizer may be microscopically dispersed in the toner image-receiving layer or microscopically phase-separated in an island-sea-type, or it may be thoroughly mixed with another component such as a binder to form a solution.

The plasticizer is used in an amount of, for example, 0.001 to 90% by mass, preferably 0.1 to 60% by mass, and particularly preferably 1 to 40% by mass, based on the toner image-receiving layer.

The plasticizer is usable also for the purposes of controlling the slipping property (improvement in making easier the transfer by the reduction in friction), improving the offset in the fixing part (release of the toner or layer to the fixing part) and control of the curl balance and control of the electrification (formation of toner electrostatic image).

The slip agent or releasing agent usable, if necessary, in the present invention are used for the purpose of keeping the electrophotographic image-receiving sheet of the present invention from adhering to the fixing/heating member in the fixing step. In particular, 180° peeling strength of the toner image-receiving layer at a fixing temperature to a fixing member is preferably not higher than 0.1 N/25 mm, more preferably not higher than 0.041 N/25 mm. The 180° peeling strength can be determined according to a method of JIS K 6887 by using a surface material of the fixing member.

The slip agents or releasing agents usable for the toner image-receiving sheet of the present invention are, for example, sodium higher alkylsulfates, higher alcohol/higher fatty acid esters, Carbowax, higher alkyl phosphoric acid esters, silicone compounds, modified silicones and cured silicones.

Polyolefin waxes, fluorine-containing oils, fluorine-containing waxes, carnauba wax, microcrystalline wax and silane compounds are also preferred.

The slip agents and releasing agents usable herein are described in U.S. Pat. Nos. 2,882,157; 3,121,060; and 3,850,640; French Patent No.2180465; British Patent Nos. 955061; 1143118; 1263722; 1270578; 1320564; 1320757; 2588765; 2739891; 3018178; 3042522; 3080317; 3082087; 3121060; 3,222,178; 3295979; 3489567; 3516832; 3658573; 3679411; and 3870521; J.P. KOKAI No. Sho 49-5017; 51-141623; 54-159221; and 56-81841; and Research Disclosure No. 13969.

The amount of the slip agent or releasing agent used is 5 to 500 mg/m², preferably 10 to 200 mg/m². When an oil for preventing the offset to the fixing member in the fixing part is not used or, in other words, in case of so-called oilless fixing, the amount of the slip agent or releasing agent used is, for example, 30 to 3,000 mg/m², preferably 100 to 1,500 mg/m².

Because waxy slip agent or releasing agent is scarcely soluble in organic solvents, it is preferred that an aqueous dispersion thereof is prepared and then a dispersion thereof with a thermoplastic resin solution is prepared and used. Wax slip agent or releasing agent is present in the form of fine particles in the thermoplastic resin. In this case, the amount of the slip agent is 5 to 10,000 mg/m², preferably 50 to 5,000 mg/m².

The slip agents or releasing agents are, for example, silicone compounds, fluorine-containing compounds and waxes.

As the slip agents or releasing agents, there can be generally used compounds described in "*Kaitei, Wax no Seishitsu to Oyo* (Properties and Application of Waxes, Revised Edition)" (published by Saiwai Shobo) and "Silicone Handbook" published by The Nikkan Kogyo Shinbun Ltd. Further, silicone compounds, fluorine-containing compounds and waxes described in the following specifications are preferred: J. P. KOKOKU Nos. Sho 59-38581 and Hei 4-32380; J.Patent Nos. 2838498 and 2949558; J.P. KOKAI Nos. Sho 50-117433, 52-52640, 57-148755, 61-62056, 61-62057 and 61-118760; and J.P. KOKAI Nos. Hei 2-42451, 3-41465, 4-212175, 4-214570, 4-263267, 5-34966, 5-119514, 6-59502, 6-161150, 6-175396, 6-219040, 6-230600, 6-295093, 7-36210, 7-43940, 7-56387, 7-56390, 7-64335, 7-199681, 7-223362, 7-287413, 8-184992, 8-227180, 8-248671, 8-248799, 8-248801, 8-278663, 9-152739, 9-160278, 9-185181, 9-319139, 9-319143, 10-20549, 10-48889, 10-198069, 10-207116, 11-2917, 11-44969, 11-65156, 11-73049 and 11-194542. A combination of two or more of these compounds can also be used.

Examples of the silicone compounds include silicone oils such as non-denatured silicone oils (such as dimethylsiloxane oil, methyl hydrogen silicone oil, phenyl methyl silicone oil, and commercial products such as KF-96, KF-96L, KF-96H, KF-99, KF-50, KF-54, KF-56, KF-965, KF-968, KF-994, KF-995, HIVAC F-4 and F-5 (Shin-Etsu Chemical Co., Ltd.); SH200, SH203, SH490, SH510, SH550, SH 710, SH704, SH705, SH7028A, SH7036, SM7060, SM7001, SM7706, SH7036, SH8710, SH1107 and SH8627 (Toray Dow Corning Silicone Co.).

The fluorine compounds include fluorine oils [Daifloyl #1, #3, #10, #20, #50 and #100 and Unidyn TG-440, TG-452, TG-490, TG-560, TG-561, TG-590, TG-652, TG-670U, TG-991, TG-999, TG-3010, TG-3020 and TG-3510 (Daikin industries, Ltd.); MF-100, MF-110, MF-120, MF-130, MF-160 and MF-160E (Tohchm Products); Surfuron S-111, S-112, S-113, S-121, S-131, S-132, S-141 and S-145 (Asahi Glass Co., Ltd.); and FC-430 and FC-431 (Mitsui Fluorochemical)]; fluorine rubbers [LS63U (Toray Dow Corning Silicone Co.); fluorine modified resins [Modipar F200, F220, F600, F2020 and F3035 (Nippon Oils and Fats Co., Ltd.); Diaromer FF203 and FF204 (Dainichiseika Colour & Chemicals Mfg. Co., Ltd.).

The waxes include petroleum waxes such as paraffin waxes [Paraffin Wax 155, 150, 140, 135, 130, 125, 120 and 115, HNP-3, HNP-5, HNP-9, HNP-10, HNP-11, HNP-12, HNP-14G, SP-0160, SP-0145, SP-1040, SP-1035, SP-3040, SP-3035, NPS-8070, NPS-L-70, OX-2151, OX-2251, EMUSTAR-0384 and EMUSTAR-0136 (Nippon Seiro Co., Ltd.); Serozole 686, 428, 651-A, A, H-803, B-460, E-172, 866, K-133, Hydrin D-337 and E-139 (Chukyo Yushi); and 125° paraffin, 125° FD, 130° paraffin, 135° paraffin, 135° H, 140° paraffin, 140° N, 145° paraffin and paraffin wax M (Nisseki Mitsubishi Oil Co., Ltd.)].

The slip agents or releasing agents incorporated, if necessary, into the toner image-receiving layer of the present invention include derivatives, oxides, purified products and mixtures of those described above. They may have a reactive substituent.

In the present invention, the slip agent or releasing agent is used in an amount of, for example, 0.1 to 10% by mass, preferably 0.3 to 8.0% by mass, and particularly preferably 0.5 to 5.0% by mass, based on the toner image-receiving layer.

As the organic or inorganic fillers which can be incorporated into the toner image-receiving layer of the present invention, if desired, those known as reinforcing agent, filler or reinforcing agent for the binder resins are usable. The fillers can be selected with reference to "*Binran Gomu•Plastic Haigo Yakuhin* (Handbook of Chemicals to be Incorporated into Rubbers and Plastics)" (edited by Rubber Digest Co.), "*Shin-pan Plastic Haigozai, Kiso to Oyo* (Additives to Plastics, Base and Application, New Edition) (published by Taisei-Sha) and "Filler Handbook" (published by Taisei-Sha).

The fillers usable herein include various inorganic fillers (or pigments). The inorganic pigments are, for example, silica, alumina, titanium dioxide, zinc oxide, zirconium oxide, mica-like iron oxide, white lead, lead oxide, cobalt oxide, strontium chromate, molybdenum pigments, smectites, magnesium oxide, calcium oxide, calcium carbonate and mullite. As the fillers, silica and alumina are particularly preferred. Two or more fillers can be used together.

As the fillers, those having a small particle diameter are preferred. When a filler having a large particle diameter is used, the surface of the toner image-receiving layer is easily roughened.

The silica is divided into groups of spherical silica and amorphous silica. Silica can be synthesized by a dry method, wet method or aerogel method. The hydrophobic silica particles may be surface-treated with trimethylsilyl group or a silicone. The silica is preferably colloidal silica. The average particle diameter of the silica is 4 to 120 nm, preferably 4 to 90 nm.

The silica is preferably porous. The average pore diameter of the porous silica is preferably 50 to 500 nm. The average pore volume per mass of the porous silica is preferably, for example, 0.5 to 3 ml/g.

Alumina includes anhydrous alumina and alumina hydrate. Crystal types of anhydrous alumina are $\alpha$, $\beta$, $\gamma$, $\delta$, $\xi$, $\eta$, $\theta$, $\kappa$, $\rho$ and $\chi$. Alumina hydrate is preferred to anhydrous alumina. The alumina hydrates usable herein are alumina monohydrates and trihydrates. Alumina monohydrate include pseudo-boehmite, boehmite and diaspore. Alumina trihydrates include gibbsite and bayerite. The average particle diameter of alumina is, for example, 4 to 300 nm, preferably 4 to 200 nm. Alumina is preferably porous. The average pore diameter of the porous alumina is preferably, for example, 50 to 500 nm. The average pore volume per mass of the porous alumina is preferably, for example, 0.3 to 3 ml/g.

Alumina hydrate can be synthesized by a sol/gel method wherein ammonia is added to an aluminum salt solution to precipitate it or by a method wherein an alkali aluminate is hydrolyzed. Anhydrous alumina can be obtained by dehydrating alumina hydrate by heating.

A static charge controlling agent is preferably incorporated into the toner image-receiving layer of the present invention for controlling the toner transfer and adhesion and also for preventing the electrostatic adhesion of the toner image-receiving layer. The static charge controlling agents are those known in the art. They include surfactants such as cationic surfactants, anionic surfactants, amphoteric surfactants and nonionic surfactants, high-molecular electrolytes and conductive metal oxides.

The static charge controlling agents include cationic antistatic agents such as quaternary ammonium salts, polyamine derivatives, cation modified polymethyl methacrylate and cation modified polystyrene; anionic antistatic agents such as alkyl phosphates and anionic polymers; and non-ionic antistatic agents such as fatty acid esters and polyethylene oxides. However, the static charge controlling agents are not limited to them.

When the toner has a negative electric charge, the electric charge controlling agent to be incorporated into the toner image-receiving layer is preferably cationic or nonionic.

The conductive metal oxides are, for example, $ZnO$, $TiO_2$, $SnO_2$, $Al_2O_3$, $In_2O_3$, $SiO_2$, $MgO$, $BaO$ and $MoO_3$. Those conductive metal oxides are usable either alone or in the form of a complex oxides of them. The metal oxides may further contain other elements. For example, $ZnO$ can contain Al, In or the like, $TiO_2$ can contain Nb, Ta or the like, and $SnO_2$ can contain Sb, Nb, halogen elements or the like (doping).

The toner image-receiving layer used in the present invention preferably has a surface electric resistance in the range of $1\times10^6$ to $1\times10^{15}$ $\Omega$ (under conditions of 25° C., 65% RH). When it is below $1\times10^6$ $\Omega$, the amount of the toner is insufficient when the toner is transferred to the toner image-receiving layer, and the obtained toner image density is inclined to be low. On the other hand, when the surface electric resistance is above $1\times10^{15}$ $\Omega$, the electric charge is formed excessively at the transfer step, the toner is not sufficiently transferred, the density of the image is low, dust is easily adhered to the electrophotographic image-receiving sheet with static electricity while the sheet is handled, and misfeeding, double feeding, discharge mark and failure of toner transfer are caused unfavorably.

The optimum surface electric resistance of a transparent toner image-receiving layer is $10^{10}$ to $10^{13}$ $\Omega/cm^2$, preferably $5\times10^{10}$ to $5\times10^{12}$ $\Omega/cm^2$. The amount of the antistatic agent used is such that the surface electric resistance will be in this range. The surface electric resistance on the back surface of the support (opposite to the toner image-receiving layer) is $5\times10^8$ to $3.2\times10^{10}$ $\Omega/cm^2$, preferably $1\times10^9$ to $1\times10^{10}$ $\Omega/cm^2$.

The surface electric resistance is determined according to JIS K 6911. Namely, water content of a sample is controlled by keeping it in an atmosphere having a temperature of 20° C. and a humidity of 65% for at least 8 hours and then applying an electric current to the sample under 100 V with R8340 (Advantest Corporation) under the same environmental conditions as above for 1 minute, and then the surface electric resistance is determined.

The toner image-receiving layer used in the present invention may contain a fluorescent brightening agent, white pigment, coloring pigment, dye, etc. for improving the image quality, particularly degree of whiteness.

The fluorescent brightening agents are compounds having an absorption band in a near-ultraviolet zone and emitting the fluorescence in the range of 400 to 500 nm. Known fluorescent brightening agents are usable without any particular limitation. Preferred fluorescent brightening agents are, for example, compounds described in The Chemistry of Synthetic Dyes (edited by K. Veen Rataraman), Volume V, Chapter 8. Concretely, they include stilbene compounds, coumarin compounds, biphenyl compounds, benzoxazoline compounds, naphthalimide compounds, pyrazoline compounds and carbostyryl compounds. Examples of them include White Falfar PSN, PHR, HCS, PCS and B (Sumitomo Chemical Co., Ltd.) and UVITEX-OB (Ciba-Geigy).

As the white pigments, the inorganic pigments (titanium oxide, calcium carbonate, etc.) described above with reference to the fillers are usable. The coloring pigments include various pigments described in, for example, J.P. KOKAI No. Sho 63-44653 and azo pigments (azo lakes such as Carmine 6B and Red 2B; insoluble azo pigments such as Monoazo Yellow, Disazo Yellow, Pyrazolo Orange and Vulcan Orange; and condensed azo pigments such as Chromophthal Yellow and Chromophthal Red), polycyclic pigments (phthalocyanine pigments such as Copper Phthalocyanine Blue and Copper Phthalocyanine Green; dioxazine pigments such as Dioxazine Violet; isoindolinone pigments such as Isoindolinone Yellow; threne pigments such as perylene, perinone, flavanthrone and thioindigo), lake pigments (Malachite Green, Rhodamine B, Rhodamine G and Victoria Blue B) and inorganic pigments such as oxides, titanium dioxide, red iron oxide, sulfates (precipitated barium sulfate), carbonates (precipitated calcium carbonate), silicates (hydrous silicates and anhydrous silicates) and metal powders (aluminum powder, bronze powder, zinc powder, carbon black, chrome yellow and Prussian blue).

As the dyes, various known dyes are usable. The oil-soluble dyes include anthraquinone compounds and azo compounds. Examples of the water-insoluble dyes include vat dyes such as C.I. Vat Violet 1, C.I. Vat Violet 2, C.I. Vat Violet 9, C.I. Vat Violet 13, C.I. Vat Violet 21, C.I. Vat Blue 1, C.I. Vat Blue 3, C.I. Vat Blue 4, C.I. Vat Blue 6, C.I. Vat Blue 14, C.I. Vat Blue 20 and C.I. Vat Blue 35; disperse dyes such as C.I. Disperse Violet 1, C.I. Disperse Violet 4, C.I. Disperse Violet 10, C.I. Disperse Blue 3, C.I. Disperse Blue 7 and C.I. Disperse Blue 58; and oil-soluble dyes such as C.I. Solvent Violet 13, C.I. Solvent Violet,14, C.I. Solvent Violet 21 and C.I. Solvent Violet 27; and C.I. Solvent Blue 11, C.I. Solvent Blue 12, C.I. Solvent Blue 25 and C.I. Solvent Blue 55.

Colored couplers used in the silver salt photography are also preferably used.

The toner image-receiving layer used in the present invention preferably has a high degree of whiteness. As for the degree of whiteness, L* value in CIE 1976 (L*a*b*) color space is at least 80, preferably at least 85 and more preferably at least 90. The tinge of the white color is desirably as neutral as possible. As for the tinge of the white color, the value of (a*)2+(b*)2 in L*a*b* space is preferably not higher than 50, more preferably not higher than 18 and most preferably not higher than 5.

The toner image-receiving layer of the present invention preferably has a high gloss. As for the surface gloss, 45° surface gloss in the whole zone ranging from white (no toner) to black (maximum toner concentration) is preferably not lower than 60, more preferably not lower than 75 and most preferably not lower than 90. However, the surface gloss is preferably not higher than 110. When it is higher than 110, the gloss is like a metallic gloss which is unsuitable for the image quality.

The surface gloss can be determined according to JIS Z 8741.

The smoothness of the toner image-receiving layer used in the present invention is preferably high. As for the degree of smoothness, the arithmetic mean roughness (Ra) in the whole zone ranging from white (no toner) to black (maximum toner density) is preferably not higher than 3 μm, more preferably not higher than 1 μm and most preferably not higher than 0.5 μm.

The arithmetic mean roughness can be determined according to JIS B 0601, B 0651 and B 0652.

The toner image-receiving layer used in the present invention may contain various antioxidants, agents for preventing aging, agents for preventing deterioration, agents for preventing deterioration caused by ozone, ultraviolet absorbers, light stabilizers, antiseptics and antifungal agents for improving the stability of the output image and also the stability of the image-receiving layer per se.

The antioxidants include, for example, chroman compounds, coumaran compounds, phenol compounds (such as hindered phenol), hydroquinone derivatives, hindered amine derivatives and spiroindane compounds. The antioxidants usable herein are those described in J. P. KOKAI Sho 61-159644.

The agents for preventing aging are, for example, those described on pages 76 to 121 of *Binran Gomu•Plastic Haigo Yakuhin* (Handbook of Chemicals to be Incorporated into Rubbers and Plastics)" (edited by Rubber Digest Co. in 1993).

The ultraviolet absorbers are, for example, benzotriazole compounds (U.S. Pat. No. 3,533,794), 4-thiazolidone compounds (U.S. Pat. No. 3,352,681), benzophenone compounds (J.P. KOKAI No. Sho 46-2784) and ultraviolet absorbing polymers (J.P. KOKAI No. Sho 62-260152).

The metal complexes are, for example, those described in U.S. Pat. Nos. 4,241,155, 4,245,018 and 4,254,195, and J.P. KOKAI Nos. Sho 61-88256, Sho 62-174741, Sho 63-199248, Hei 1-75568 and Hei 1-74272.

Further, ultraviolet absorbers and photo stabilizers described on pages 122 to 137 of *Binran Gomu•Plastic Haigo Yakuhin* (Handbook of Chemicals to be Incorporated into Rubbers and Plastics)" (edited by Rubber Digest Co.) are also preferably used.

The toner image-receiving layer in the present invention can further contain known photographic additives. The photographic additives are described in, for example, Research Disclosure (hereinafter referred to as "RD") Nos. 17643 (December, 1978), 18716 (November, 1979) and 307105 (November, 1989). The positions in RD are summarized in the following table.

| | Additive | RD 17643 | RD 18716 | RD 30710 |
|---|---|---|---|---|
| 1. | Whitening agent | p. 24 | p. 648, right column | p. 868 |
| 2. | Stabilizer | pp. 24–25 | p. 649, right column | pp. 868–870 |
| 3. | Light absorber UV absorber | pp. 25–26 | p. 649, right column | p. 873 |
| 4. | Dye image stabilizer | p. 25 | p. 650, right column | p. 872 |
| 5. | Hardening agent | p. 26 | p. 651, left column | pp. 874–875 |
| 6. | Binder | p. 26 | p. 651, left column | pp. 873–874 |
| 7. | Plasticizer, lubricant | p. 27 | p. 650, right column | p. 876 |
| 8. | Coating aid Surfactant | pp. 26–27 | p. 650, right column | pp. 875–876 |
| 9. | Antistatic agent | p. 27 | p. 650, right column | pp. 876–877 |

Intermediate Layer

In the electrophotographic image-receiving sheet of the present invention, an intermediate layer can be provided between the support and the toner image-receiving layer, for the purpose of further improving the gloss of the toner image-receiving layer or producing the sheet at an industrially advantageous cost.

The intermediate layer preferably comprises a polyester resin different from the polyester resin used for the toner image-receiving layer. Polyester resins suitable for forming the intermediate layer are polyethylene terephthalates.

Those polyester resins can be produced in the same manner as that for the production of the polyester resins used for forming the toner image-receiving layer. The toner image-receiving layer and the intermediate layer can be formed at the same time by the co-melt-expression method.

Other polyester resins usable herein are those having a number-average molecular weight of, for example, about 15,000 to 50,000, preferably about 18,000 to 30,000.

The polyester resins may be those containing bisphenol A as the polyhydric alcohol component like the polyester resins used for forming the toner image-receiving layer. Bisphenol A content may be either more or less than 10 molar % based on the whole polyhydric alcohols.

The polyester resin is particularly preferably polyethylene terephthalate.

The thickness of the intermediate layer is, for example, about 5 to 50 μm, preferably about 10 to 40 μm.

The relationship between the thickness of the toner image-receiving layer (TR) and the intermediate layer (IM) is preferably as follows:

$$2 \leq TR \leq 50$$

$$5 \leq IM \leq 50$$

$$10 \leq TR+IM \leq 70$$

(unit: μm)

Protecting Layer

A protecting layer can be provided on the surface of the toner image-receiving layer of the electrophotographic image-receiving sheet of the present invention for the purposes of protecting the surface, improving the storability and handleability, imparting possibility of autography, improving the passability through machines and imparting anti-offset property. The protecting layer may be composed of one layer or two or more layers. The protecting layer may contain various thermoplastic resins and thermosetting resins as binders. The resin is preferably the same as that used in the toner image-receiving layer. However, the thermodynamic properties and electrostatic properties of the protective layer are not necessarily the same as those of the toner image-receiving layer, and the respective layers can have optimum properties.

The protecting layer can contain the above-described various additives usable for the toner image-receiving layer.

In particular, the protecting layer can contain, for example, plasticizers, releasing agents and slip agents.

The outmost surface layer (for example, the surface-protecting layer when it is provided) of the electrophotographic image-receiving sheet of the present invention preferably has a high compatibility with the toner from the viewpoint of the fixing property. Concretely, the angle of contact with the molten toner is preferably 0 to 40° or the like.

Back Layer

The electrophotographic image-receiving sheet of the present invention can have a back layer for the purposes of providing output ability at the backside of the support, improving the backside image output quality, improving the curl balance and improving the passability through the machines.

The composition of the back layer may be the same as that of the toner image-receiving layer for the purpose of improving both sides output ability for forming the image. The back layer can contain various additives described above with reference to the toner image-receiving layer. An electrification controlling agent is suitable as the additive. The back layer may comprise either one layer or two or more layers.

The back layer may be an oil-absorbing layer when a releasing oil is used for a fixing roller or the like for preventing offset in the fixing step.

The back layer can have the mat surface.

Other Optional Layers

The electrophotographic image-receiving sheet of the present invention can have a contact improving layer for improving the contact between the support and the toner image-receiving layer, in addition to the intermediate layer. The contact improving layer can contain various additives described above, particularly the crosslinking agent. The electrophotographic image-receiving sheet of the present invention may have a cushion layer between the contact improving layer and the toner image-receiving layer for improving the toner acceptability.

The electrophotographic image-receiving sheet of the present invention can have an intermediate layer in addition to the above-described various layers. For example, the intermediate layer can be formed between the toner image-receiving layer and the contact improving layer, between the contact improving layer and the cushion layer, between the cushion layer and the toner image-receiving layer or between the toner image-receiving layer and the storability improving layer.

Toner for Color Electrophotography

The electrophotographic image-receiving sheet of the present invention is used in combination with a toner or toner particles in the printing or copying. The toner used in the present invention can be obtained by a pulverization method or suspension granulation method.

In the pulverization method, the toner is produced by the kneading, pulverization and classification. The binder resins usable for the production of the toner by the pulverization include acids such as acrylic acid, methacrylic acid and maleic acid and esters of them; and resins obtained by polymerizing monomers such as polyesters; polysulfonates; polyethers and polyurethanes, and resins obtained by copolymerizing two or more of these monomers. These resins are thoroughly kneaded with a wax component and other toner-constituting materials by a hot kneader such as a hot roll, kneader or extruder and then mechanically pulverized and classified.

The toner obtained by the pulverization method contains 0.1 to 10% by weight, preferably 0.5 to 7% by weight, based on the toner, of a wax component.

In the suspension granulation method, the toner is produced by mixing a binder, a colorant, and a releasing agent (and, if necessary, a magnetic material, antistatic agent and other additives) in a hydrophobic solvent, coating the obtained composition with a polymer having a carboxyl group, dispersing the coated product in an aqueous medium in the presence of a hydrophilic inorganic dispersant having a BET specific surface area of 10 to 50 $m^2/g$ and/or a viscosity modifier, diluting the obtained suspension with an aqueous medium and, if desired, heating the obtained suspension and/or reducing the pressure to remove the solvent. In the present invention, the toner produced by the suspension granulation method is particularly preferred and when this toner is used, the results more excellent than those obtained by using the toner obtained by the pulverization method might be obtained.

As the binders for suspension granulation method for obtaining toners, all of known binder resins are usable. They include styrenes, e.g., styrene and chlorostyrene; monoolefins, e.g., ethylene, propylene, butylene and isoprene; vinyl esters, e.g., vinyl acetate, vinyl propionate, vinyl benzoate and vinyl butyrate; α-methylene aliphatic monocarboxylic acid esters, e.g., methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g., vinyl methyl ether, vinyl ethyl ether and vinyl butyl ether; and vinyl ketones, e.g., vinyl methyl ketone, vinyl hexyl ketone and vinyl isopropenyl ketone. Particularly typical binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In those resins, styrene/acrylic resin is preferred in the present invention.

The colorants to be contained in the toner binders for the toner are well-known colorants without any limitation. The typical examples of the colorants are carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3.

The colorant content is, for example, 2 to 8% by mass. When the colorant content is less than 2% by mass, the coloring power is easily weakened and, on the other hand, when it is more than 8% by mass, the transparency of the color toner is easily reduced.

The toner preferably contains a releasing agent. An example of the preferred releasing agents is a wax. The releasing agents usable herein include low-molecular weight polyolefins such as polyethylene, polypropylene and polybutene; silicone resins which can be softened by heating, and fatty acid amides such as oleamide, erucamide, ricinolamide and stearamide; vegetable waxes such as carnauba wax, rice wax, candelilla wax, haze wax and jojoba oil; animal waxes such as bees wax; mineral or petroleum waxes such as montan wax, ozocerite, ceresine, paraffin wax, microcrystalline wax and Fischer-Tropsch wax; and modified products of them. When a wax containing a wax ester having a high polarity such as carnauba wax or candelilla wax is used, a large amount of the wax is exposed on the toner particle surface and, on the contrary, when a wax having a low polarity such as polyethylene wax or paraffin wax is used, the amount of the wax exposed on the surface is inclined to be small.

Irrespective of the inclination to be exposed on the surface, the waxes having a melting point in the range of 30 to 150° C. are preferred and those of 40 to 140° C. are more preferred.

The toner used in the present invention is mainly composed of the above-described colorant and binder. The average particle diameter of the toner is 3 to 15 μm, preferably 4 to 8 μm. The storage elastic modulus G' of the toner per se (determined at an angular frequency of 10 rad/sec) at 150° C. is preferably in the range of 10 to 200 Pa.

The toner used in the present invention may contain an additive. Inorganic compounds in the form of a fine powder and organic compounds in the form of fine particles are used as the additive. The inorganic particles are, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$ and $MgSO_4$. The fine particles of organic compounds are fine powders of fatty acids and derivatives thereof and metal salts thereof, and also fine powders of resins such as fluororesins, polyethylene resins and acrylic resins.

Image-forming Apparatus and Method

The method for forming an image on the electrophotographic image-receiving sheet of the present invention is not particularly limited. Various electrophotographic methods can be employed.

For example, a color image can be preferably formed on the electrophotographic image-receiving sheet of the present invention. A colored image can be formed with an electrophotographic apparatus capable of forming a full-colored image. An ordinary electrophotographic apparatus comprises an image-receiving sheet sending part, a latent image-forming part and a developing part provided close to the latent image-forming part. In some apparatus, an intermediate toner image-transfer part is provided close to the latent image-forming part and the image-receiving sheet sending part at a center of the apparatus.

For improving the image quality, an adhesion transfer method or a heat-supporting transfer method to be conducted in place of or in combination with the electrostatic transfer or bias roller transfer method is known. The structures of the transfer apparatus is described in, for example, J.P. KOKAI Nos. Sho 63-113576 and Hei 5-341666. The heat-supporting transfer method wherein an intermediate transfer belt is used is preferred particularly when a toner having a small particle diameter (not larger than 7 μm) is used. The intermediate belt is, for example, an endless belt made of electroformed nickel. This belt has a thin silicone or fluorine film on the surface thereof so as to have a releasing property. Preferably, the intermediate belt used after the toner transfer to the electrophotographic image-receiving sheet or in the latter half of the stage of the transfer is provided with a cooling device. With the cooling device, the toner is cooled to a temperature lower than the softening point of the binder or lower than the glass transition temperature thereof, then efficiently transferred to the electrophotographic image-receiving sheet to make the release thereof from the intermediate belt possible.

The fixing is an important step for the gloss and smoothness of the final image. For the fixing, a method wherein a heating pressure roller is used and another method wherein a belt is used are known. From the viewpoints of the image qualities such as gloss and smoothness, the belt fixing method is preferred. As for this method, a method described in J. P. KOKAI No. Hei 11-352819 wherein an oilless type belt is used and also a method described in J.P. KOKAI Nos. Hei 11-231671 and Hei 5-341666 wherein the secondary transfer and the fixing are performed at the same time are known.

The surface of the fixing belt is preferably treated with a surface-treating agent containing silicone, fluorine or a mixture of them for preventing the peeling of the toner or the offset of the toner component. In the latter half of the fixing step, a cooling apparatus for the belt is preferably provided to facilitate the release of the electrophotographic image-receiving sheet. The cooling temperature is preferably lower than the softening point or glass transition point of the toner binder and/or the polymer in the toner image-receiving layer of the electrophotographic image-receiving sheet. On the other hand, in the initial stage of the fixing, the temperature must be elevated to a point at which the toner image-receiving layer of the electrophotographic image-receiving sheet or the toner is sufficiently softened. Concretely, the cooling temperature is practically preferably 30 to 70° C., and the temperature in the initial stage of the fixing is preferably 100 to 180° C.

The following Examples and Comparative Examples will further illustrate the present invention, which by no means limit the invention.

In the following Examples and Comparative Examples, percentages and parts are given by mass.

Preparation of Polyester Resin

SYNTHESIS EXAMPLE 1

(Preparation of Polyester Resin 1 Used for Forming Toner Image-receiving Layer)

3.5 parts of ethylene glycol, 7.8 parts of diethyl terephthalate and 11.5 parts of bisphenol A/ethylene oxide adduct (bisphenol A having 1 mol of ethylene oxide added to both ends thereof) were fed into a trans-esterification reaction tank provided with a distillation column. 0.005 part of zinc acetate dihydrate as a trans-esterification catalyst was added thereto. The reaction tank was heated. When the temperature in the reaction tank had reached 130° C., the stirring was started to conduct the trans-esterification reaction. The reaction temperature was elevated to 240° C. after 2 hours while methanol as a by-product was taken through the top of the distillation column. After confirming that the distillation of methanol had been completed, the reaction solution was poured into a polycondensation tank provided with a pressure reduction device. After completion of the reaction, 0.007 part of antimony trioxide and 0.004 part of trimethylphosphoric acid were added to the reaction solution. Then, the temperature was elevated to 275° C. and the pressure in the reaction system was gradually reduced to perform the polycondensation reaction. Ethylene glycol thus formed was evaporated. The reaction was further continued for 4 hours to obtain polyester resin 1 having a intrinsic viscosity of 0.55 and a flow starting temperature of 130° C.

SYNTHESIS EXAMPLES 2 TO 6

Polyester resins shown in the following Table 1 were prepared in the same manner as that in Synthesis Example 1. The properties of the obtained polyester resins are shown in Table 1 together with the properties of polyester resin 1.

TABLE 1

|  | Synthesis Example 1 Polyester resin 1 | Synthesis Example 2 Polyester resin 2 | Synthesis Example 3 Polyester resin 3 | Synthesis Example 4 Polyester resin 4 | Synthesis Example 5 (Ref.) Polyester resin 5 | Synthesis Example 6 (Ref.) Polyester resin 6 |
|---|---|---|---|---|---|---|
| Acid component[*1] | TA (100) | TA (100) | TA (80) SA (20) | TA (100) | TA (100) | TA (40) SA (60) |
| Alcohol component[*2] | BAEG (90) EG (10) | BAEG (30) EG (70) | BAEG (90) EG (10) | BAEG (20) EG (80) | BAEG (90) EG (10) | BAEG (90) EG (10) |
| Intrinsic viscosity | 0.55 | 0.45 | 0.61 | 0.67 | 0.22 | 0.55 |
| Flow starting temperature (° C.) | 130 | 115 | 118 | 138 | 98 | 80 |
| Glass transition temperature (° C.) | 73 | 71 | 61 | 72 | 72 | 32 |

Notes:
[*1] Numbers in the parentheses show the mol fraction of an acid component based on the molar number of the total acid components.
[*2] Numbers in the parentheses show the molar fraction of an alcohol component based on the molar number of the total alcohol components.
(Abbreviations)
TA: terephthalic acid
SA: sebacic acid
BAEG: bisphenol A/ethylene oxide adduct
EG: ethylene glycol The polyester resin was dissolved in a solvent mixture of phenol/1,1,2,2-tetrachloroethane=3/2 (mass ratio) and the intrinsic viscosity was determined with Ubbellohde viscometer at 25° C.

After pulverizing the polyester resin, the flow starting temperature was determined with a flow tester (CFT-500D, Shimadzu Corporation). The determination conditions comprised a temperature elevation rate of 5° C./min, cylinder pressure of $4.903 \times 10^6$ Pa, preheating temperature of 300° C., aperture diameter of die of 0.5 mm, die length of 1 mm and shearing stress of $6.129 \times 10^5$ Pa.

The glass transition temperature was determined according to JIS K7121 with DSC (DSC-50, Shimadzu Corporation) under a condition of 10° C./min.

Preparation of Support

The back surface (the surface opposite to the toner image-receiving layer side) of a base paper (produced by a method described in an Example in J. P. KOKAI No. 2000-112166) was treated with a flame. Polypropylene resin (Sun Aroma-PHAO3A of Montell STK Sunrise-Sha having a melt flow rate of 42 g/10 min and density of 0.905 g/cm³) was melt-extruded through T-die to form a layer having a thickness of 20 μm on the base paper and thereby to obtain the support.

EXAMPLE 1

The polyester resin 1 shown in Table 1 given above was applied to the surface of the support obtained as described above to form an upper layer having a thickness of 5 μm, and a polyethylene terephthalate (intrinsic viscosity: 0.06) was also applied to form a lower layer having a thickness of 20 μm by the co-melt-extrusion method, to form a laminate to be used as an image-receiving sheet for electrophotography.

EXAMPLE 2

Sheets for the electrophotography were obtained in the same manner as in Example 1, except that polyester resin 1 was replaced with polyester resin 3.

EXAMPLE 3

A laminate to be used as an image-receiving sheet for electrophotography was obtained by forming a single layer composed of polyester resin 4 in a thickness of 30 μm on the support surface, in place of the double layer structure composed of the upper layer of polyester resin 1 and the lower layer of polyethylene terephthalate, in the same manner as that of Example 1.

EXAMPLE 4

Polyester resin 2 shown in Table 1 given above was applied to the surface of the support obtained as described above to form an upper layer having a thickness of 25 μm, and a polyethylene terephthalate (intrinsic viscosity: 0.06) was also applied to form a lower layer having a thickness of 25 μm by the co-melt-extrusion method, to form a laminate to be used as an image-receiving sheet for electrophotography.

COMPARATIVE EXAMPLE 1

Image-receiving sheets for the electrophotography were obtained in the same manner as in Example 1, except that polyester resin 1 was replaced with polyester resin 5.

COMPARATIVE EXAMPLE 2

Image-receiving sheets for the electrophotography were obtained in the same manner as in Example 1, except that polyester resin 1 was replaced with polyester resin 6.

The electrophotographic image-receiving sheet obtained as described above was cut into a size of A4 for obtaining a printed image. The printer used was a color laser printer (DocuColor 1250-PF) of Fuji Xerox Co., Ltd. (a fixing part had previously been taken off). An image having a color pattern having a density of black (100%), white (0%) and gray (50%) was printed to obtain an image support having a non-fixed image formed thereon.

The image support having the non-fixed image formed thereon was passed through a fixing bench having only the fixing part at 155° C. and degree of the fusion (offset) on the fixing roll was examined.

Then, the gloss of the fixed image thus obtained was determined (60° angle of incidence, HG-246, Suga Test Instruments Co., Ltd.). The obtained results are shown in Table 2 given below.

TABLE 2

|  | Example 1 | Example 2 | Example 3 | Example 4 | Comp. Example 1 | Comp. Example 2 |
|---|---|---|---|---|---|---|
| Offset | none | none | none | none | on the whole surface | partial |
| Gloss in black part | 95 | 98 | 94 | 92 | determination impossible | 98 |
| Gloss in gray part | 95 | 97 | 93 | 90 | ditto | 99 |
| Gloss in white part | 105 | 100 | 108 | 100 | ditto | 97 |

It is clear from the results shown above that image-receiving sheets for electrophotography, which are capable of providing images excellent in gloss and which have an excellent offset resistance during a fixing step at a high temperature can be obtained by using, for the toner image-receiving layer, the specific polyester resin which contains the specific amount of bisphenol A and which has the specific intrinsic viscosity, flow starting temperature and glass transition temperature.

Thus, the present invention provides an image-receiving sheet for electrophotography, which is capable of providing an image excellent in gloss and which has an excellent offset resistance during a fixing step at a high temperature.

What is claimed is:

1. An image-receiving sheet for electrophotography, comprising a support and a toner image-receiving layer provided on at least one surface of said support, wherein said toner image-receiving layer comprising a polyester resin having the following characteristic properties:

(1) said polyester resin containing at least 10% of bisphenol A, based on the molar number of the whole polyhydric alcohol components;

(2) said polyester resin having an intrinsic viscosity of 0.30 to 0.70;

(3) said polyester resin having a flow-starting temperature of 100 to 160° C.; and (4) said polyester resin having a glass transition temperature ranging from 50° C. to a temperature lower than a fixing temperature by 10° C.

2. The image-receiving sheet for electrophotography according to claim 1, said polyester resin contains at least 30% of bisphenol A, based on the molar number of the whole polyhydric alcohol components.

3. The image-receiving sheet for electrophotography according to claim 1, said polyester resin contains 50 to 95% of bisphenol A, based on the molar number of the whole polyhydric alcohol components.

4. The image-receiving sheet for electrophotography according to claim 1, said polyester resin has an intrinsic viscosity of 0.35 to 0.65.

5. The image-receiving sheet for electrophotography according to claim 1, said polyester resin has an intrinsic viscosity of 0.40 to 0.60.

6. The image-receiving sheet for electrophotography according to claim 1, said polyester resin has a flow-starting temperature of 110 to 145° C.

7. The image-receiving sheet for electrophotography according to claim 1, said polyester resin has a glass transition temperature of 50 to 120° C.

8. The image-receiving sheet for electrophotography according to claim 1, said polyester resin has a glass transition temperature of 60 to 110° C.

9. The image-receiving sheet for electrophotography according to claim 1, further comprising an intermediate layer comprising a polyester resin which is different from said polyester resin used for said toner image-receiving layer, between said support and said toner image-receiving layer.

* * * * *